United States Patent [19]

Anson

[11] Patent Number: 5,038,752

[45] Date of Patent: Aug. 13, 1991

[54] BOILING WATER DISPENSER HAVING IMPROVED WATER TEMPERATURE CONTROL SYSTEM

[75] Inventor: James H. Anson, Auburn, Ill.

[73] Assignee: Bunn-O-Matic Corporation, Springfield, Ill.

[21] Appl. No.: 426,784

[22] Filed: Oct. 25, 1989

[51] Int. Cl.⁵ .............................................. F24D 1/00
[52] U.S. Cl. .................................... 126/369; 126/374; 338/22 R; 338/23; 338/24; 219/494
[58] Field of Search ............... 126/369, 344, 348, 374, 126/377; 323/369; 338/315–320, 22 R, 13, 11, 23, 24; 219/280, 297, 307, 310, 316, 328

[56] References Cited

U.S. PATENT DOCUMENTS

| | | | |
|---|---|---|---|
| 4,173,215 | 11/1979 | Bureau et al. | 126/369 |
| 4,535,931 | 8/1985 | Bartok et al. | 126/374 |
| 4,599,993 | 7/1986 | Krauss | 126/374 |
| 4,722,321 | 2/1988 | Meister | 126/369 |

Primary Examiner—Larry Jones
Attorney, Agent, or Firm—Trexler, Bushnell, Giangiorgi & Blackstone, Ltd.

[57] ABSTRACT

A sensor assembly for boiling water dispenser includes clamping members for mounting a sensor such as a thermister in position to sense the presence and absence of steam.

13 Claims, 4 Drawing Sheets

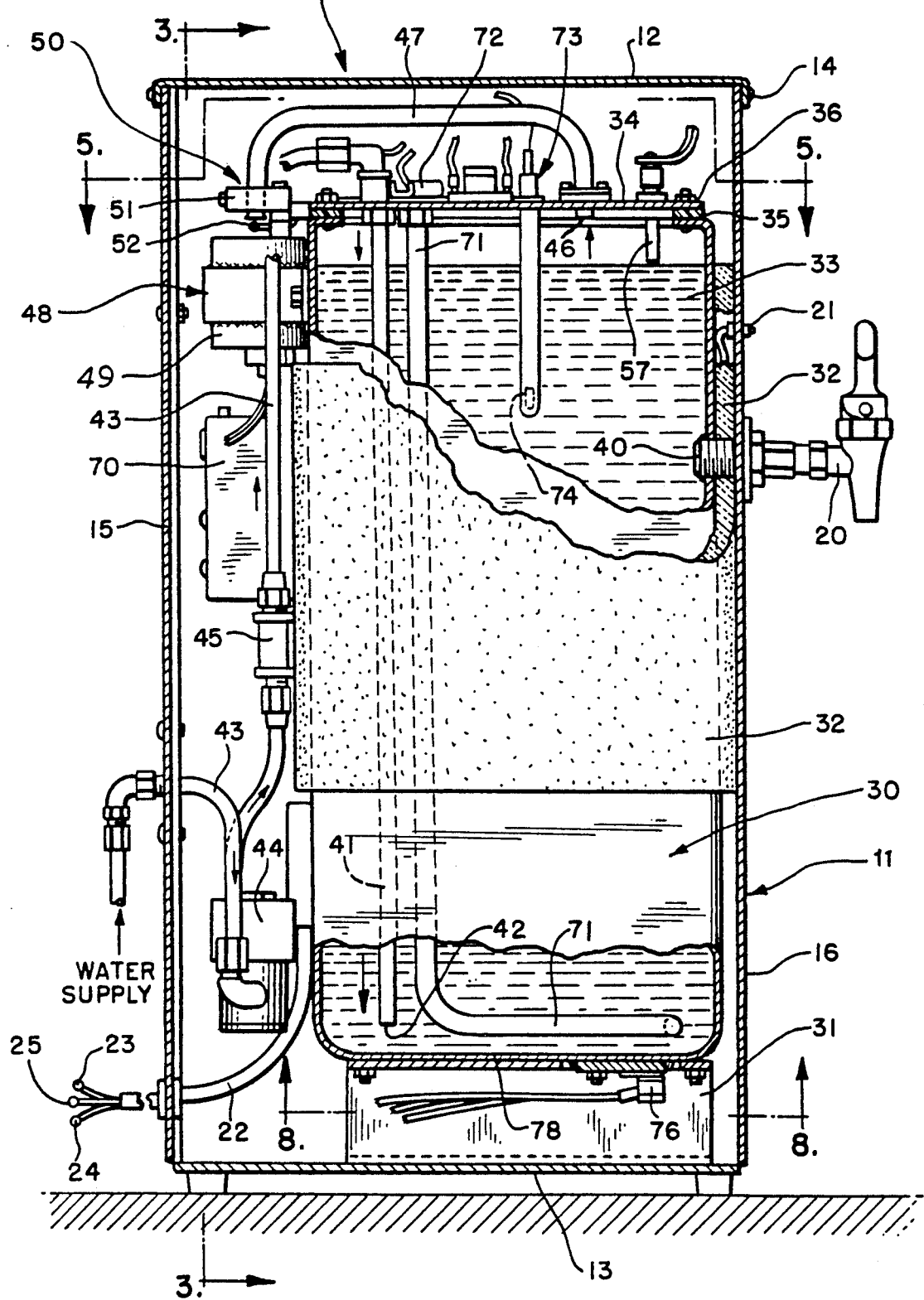

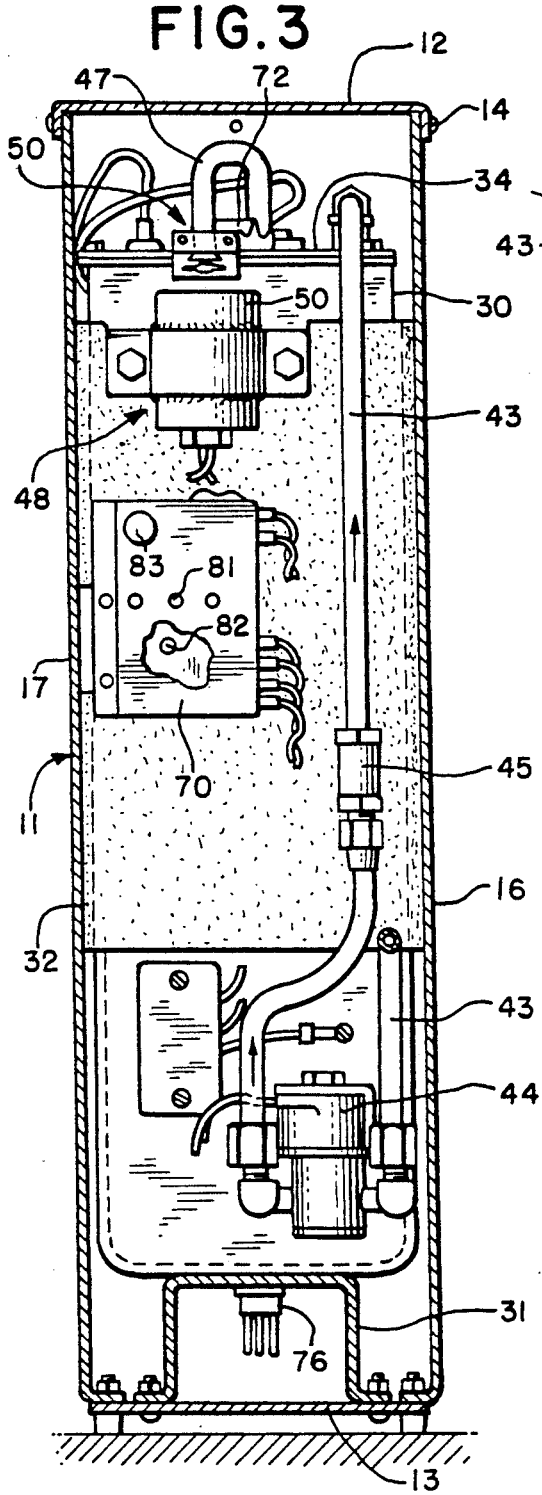

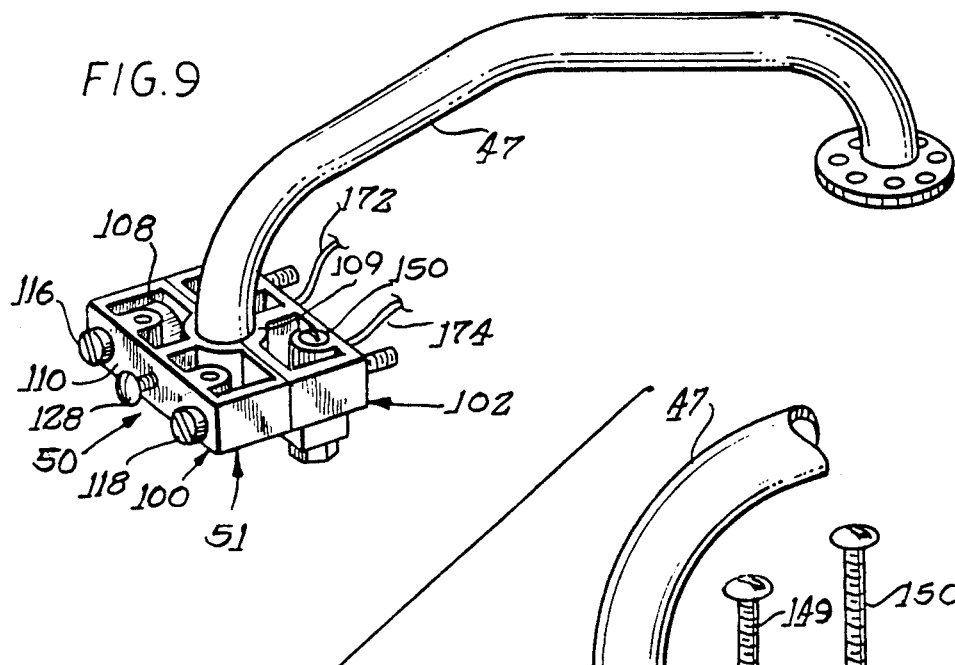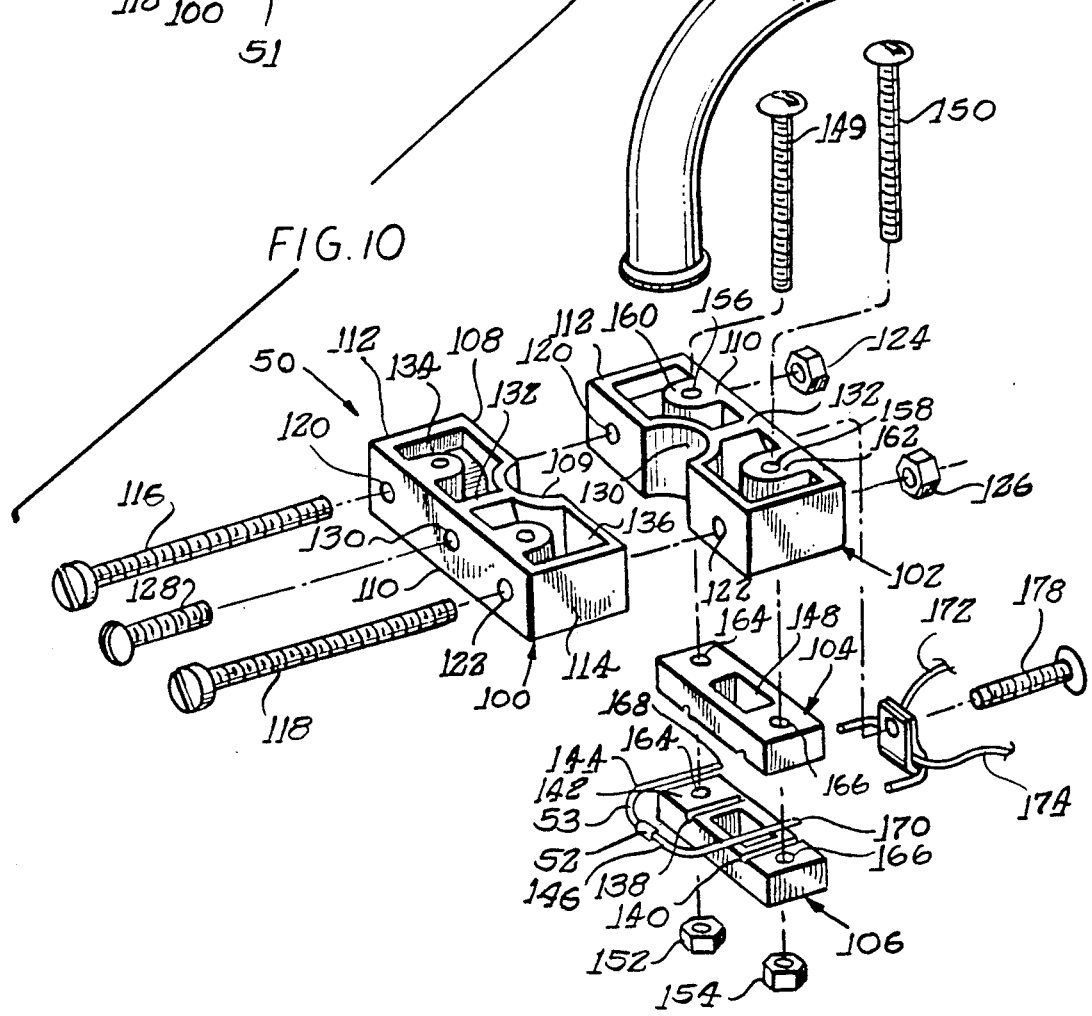

BOILING WATER DISPENSER HAVING IMPROVED WATER TEMPERATURE CONTROL SYSTEM

BACKGROUND OF THE INVENTION

The present invention is directed generally to a hot water dispensing apparatus, and more particularly to a boiling water dispenser capable of dispensing large volumes of water at boiling temperature.

As is discussed in detail in a copending application Ser. No. by John T. Knepler filed Sept. 15, 1984 assigned to the Assignee of this application, it is frequently desirable in restaurants and other commercial cooking establishments to have a source of hot water for various cooking purposes, such as the preparation of pastas, potatoes, gravies, soups and similar dishes, as well as for various cleaning purposes. To supply hot water for these and other purposes hot water dispensers have come into increasing use. Typically, these units employ a hot water reservoir in which water is heated by an electric resistance heater element. The application of electric current to the heating element is typically controlled by various means responsive to a temperature sensing element in the reservoir, such as a thermistor, to achieve a predetermined dispensing temperature. Reference is made to the aforesaid copending application for a further disclosure of the general problem and an apparatus for solving the problem.

The aforementioned Knepler application discloses an apparatus for dispensing water substantially of boiling temperature. The present invention contemplates a particular structure for mounting a sensor in a boiling water dispenser wherein temperature control is effected by presence or absence of steam generated by the boiling of the water in the reservoir which sensor provide a signal utilized for controlling the application of energy to a heater.

Accordingly, it is a general object of the present invention to provide a novel sensor mounting structure for facilitating positioning of a sensor so as to be responsive to the presence and absence of steam vented from a reservoir.

It is a more specific object of the present invention to provide a sensor mounting which is of simple and economical construction and which may be easily assembled with a sensor and a steam vent in a boiling water dispenser of the above described type.

Another specific object of the present invention is to provide a novel sensor mounting of the above described type which thermally insulates the sensor from the water reservoir and permits free access of ambient air to the sensor in the absence of venting steam.

SUMMARY OF THE INVENTION

The invention is directed to a sensor assembly or mounting for a boiling water dispensing apparatus comprising a hot water reservoir, a heater means and temperature regulating means responsive to the occurrence of boiling of the water in the reservoir to control the operation of the heater. The mounting assembly comprises multiple parts molded from material such as plastic having low thermal conductivity and adapted to be easily assembled with a sensor such as a thermister and for supporting the sensor in thermally insulated or isolated relationship with the reservoir. The mounting parts are formed so as to permit steam directed at the sensor freely to pass into the surrounding atmosphere

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings, in the several figures of which like reference numerals identify like elements, and in which:

FIG. 2 is an enlarged side cross-sectional view taken along line 2—2 of FIG. 1 partially in section to show the principal components of the boiling water dispenser;

FIG. 3 is a rear cross-sectional view of the boiling water dispenser taken along line 3—3 of FIG. 2;

FIG. 4 is a perspective view of a reservoir cover subassembly utilized in the boiling water dispenser;

FIG. 8 is a bottom cross-sectional view of the boiling water dispenser taken along line 8—8 of FIG. 2;

FIG. 9 is a perspective view showing the sensor mounting assembly mounted on a vent tube or conduct utilized in the boiling water dispenser; and FIG. 10 is an exploded perspective view of the steam in detector or sensor mounting assembly.

DESCRIPTION OF THE PREFERRED EMBODIMENT

Figure 1:
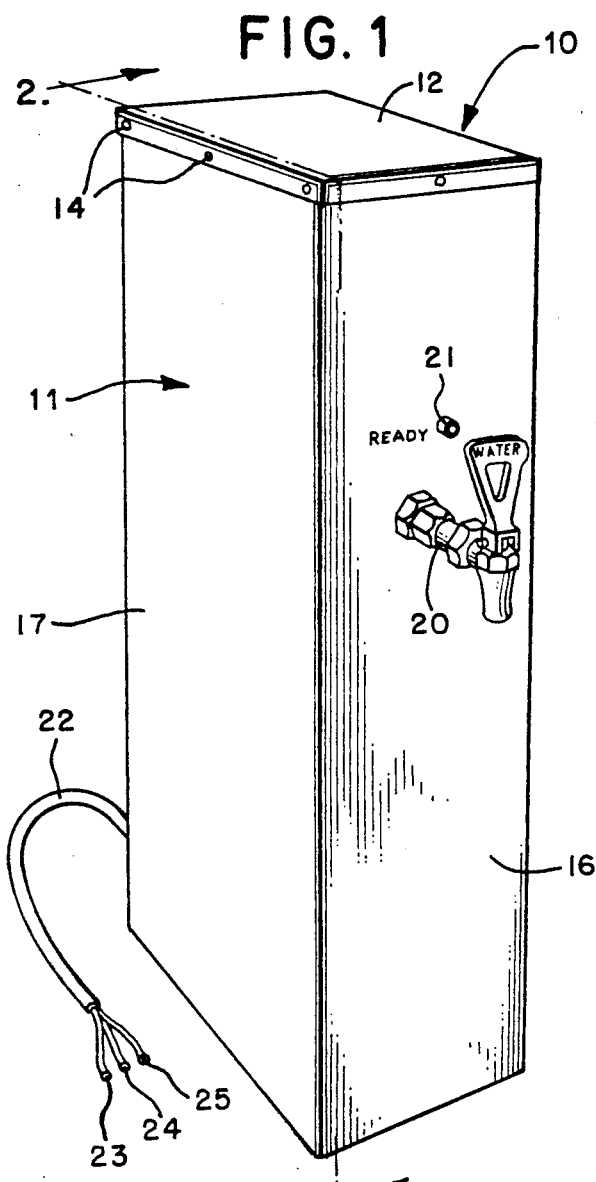
FIG. 1 is a perspective view of a boiling water dispenser including a sensor assembly constructed in accordance with the invention.
Figure 5:
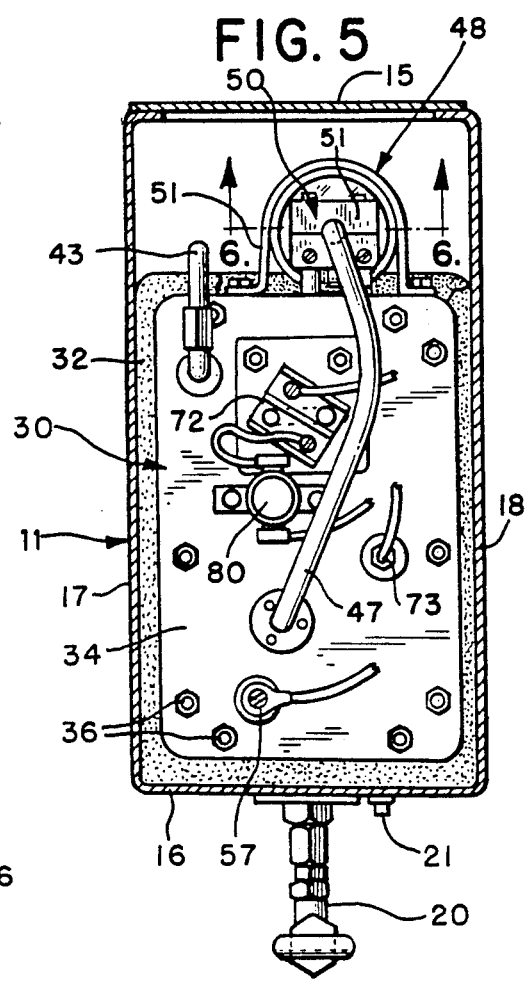
FIG. 5 is a top cross-sectional view of the boiling water dispenser taken along line 5—5 of FIG. 2.

Referring to the Figures, and particularly to FIGS. 1-3, one embodiment of boiling water dispenser 10 incorporating a sensor assembly 50 constructed in accordance with the present invention is shown in order to illustrate the invention. This dispenser 10 forms the subject matter of the above mentioned copending application and is seen to include an outer housing 11 formed of stainless steel or other appropriate material A removable cover 12 is provided at the top of the housing to provide access to the interior thereof for adjustment and servicing. A removable cover 13 (FIGS. 2 and 3) is provided at the bottom of housing 11 for the same purpose. A plurality of machine screws 14 may be provided to secure the removable top cover 12 in position. A rear panel 15 (FIG. 2) may be provided to enclose the rear of the housing. Overall, the housing 11 is preferably upstanding in form and includes vertically-elongated front, left side and right side panels 16, 17 and 18, respectively.

The front panel 16 of housing 11, the is preferably provided with user-actuated outlet means in the form of a conventional faucet assembly 20 through which water may be drawn by a user. A ready light 21 is preferably provided in close proximity to faucet 20 to indicate to the user that the water being drawn through the faucet is within an acceptable range of operating temperatures. Operating power is supplied to the boiling water dispenser by a conventional electrical cable 22 extending from the rear panel of the dispenser and terminating with three connectors 23, 24 and 25, providing line L₁, line L₂ and ground connections, respectively.

Referring to FIG. 2, within housing 11 boiling water dispenser 10 is seen to include a hot water reservoir 30 which comprises an elongated generally rectangular tank mounted in an upstanding position within the housing on a support bracket 31. A layer of insulating material 32 is provided around a substantial central portion of the hot water reservoir to provide a degree of thermal isolation for a volume of water 33 contained within the reservoir. The boiling water reservoir 30 is preferably formed of stainless steel and includes a removable top plate 34 secured over its open top end by a gasket 35 and plurality of machine screws 36. Gasket 35 forms a liquid-tight seal between top plate 34 and the side walls of reservoir 30. Faucet 20 extends through the front panel 16 of housing 11 and through the side wall of reservoir 30 so as to provide a hot water discharge port 40 at a location intermediate the top and bottom ends of housing 30. It is at this location that boiling water is withdrawn from reservoir 30.

To provide for the introduction of unheated water into reservoir 30 the reservoir is provided with an internal conduit 41 which extends from cover plate 34 downwardly to the bottom portion of the reservoir, wherein the conduit terminates to provide an inlet port 42 adjacent an inlet zone at the bottom of the reservoir. Unheated water from an external water supply is provided to conduit 41 through an inline conduit 43, which includes a solenoid-actuated flow control valve 44 and an inline flow regulator 45.

In the event that reservoir 30 should be over-filled for any reason a venting port 46 at the top end of the reservoir allows water to escape from the reservoir through a venting conduit 47 to an overflow safety switch assembly 48. Switch assembly 48 includes a cylindrical reservoir or receptacle 49 mounted to the rear wall of reservoir 30. Water overflowing from reservoir 30 through venting conduit 47 is discharged into the reservoir. As overflow water is collected in the reservoir a float-actuated switch opens to terminate the flow of water into reservoir 30.

In order to detect the initial occurrence of water boiling in reservoir 30 a steam detector assembly 50 constructed in accordance with the present invention is provided at the end of conduit 47, above the collection reservoir or receptacle 49 of overflow switch assembly 48. In this embodiment, the overflow tube or conduit also serves as a means for isolating steam from the interior of the reservoir. As shown in FIGS. 6, 7, 9 and 10, this assembly comprises a positioning member 51 formed of high temperature plastic or other material of relatively low thermal conductivity which is mounted on the tube or conduit 47 so as to position a temperature sensing element 52, preferably a thermister, in the flow path of steam discharged from the reservoir through conduit 47. In this way the thermister 52 is immediately subjected to any temperature rise associated with the steam, while remaining relatively unaffected by the temperature of the reservoir. A sleeve 53 may be provided over the thermister to protect the thermister from contamination over time.

During normal operation, the level of water 33 in reservoir 30 is maintained at a predetermined maximum level by a sensing probe assembly 57 which extends downwardly through top plate 34 to the surface of the water. The probe assembly 57 is connected to water level control circuitry within a control module 70 mounted on the rear wall of reservoir 30.

The water 33 in reservoir 30 is heated to a predetermined dispensing temperature by means of a conventional metallic-sheath type electric resistance heating element 71. As shown in FIGS. 2 and 4, this heating element 71 extends from top plate 34 downwardly within the reservoir, at the bottom end thereof being angled in a generally L-shaped configuration to provide additional heating for water entering the reservoir through inlet port 42. The heating assembly 71 is mounted by conventional means to top plate 34 and includes a conventional electrical connector assembly 72 which provides for electrical connections to an electrical current source. Temperature control is achieved by selectively applying current pulses to the heating element.

The temperature of the water in the reservoir is sensed by a temperature sensing probe assembly 73 which extends from top plate 34 to a position adjacent discharge port 40. In the manner described in U.S. Pat. No. 4,531,046, a thermistor 74 or other appropriate temperature sensing component is provided within a heat-conductive tubing of stainless steel, copper or other material, at the sensing location and connected to control module 70 by electrical conductors extending upwardly through the tubing and top plate 34.

Referring particularly to FIGS. 9 and 10, it is seen that the positioning member 51 is made up from two pairs of clamping members 100, 102 and 104, 106. The members 100 and 102 are identical to each other and respectively comprise a rectangular frame having spaced apart side sections 108, 110 and end section 112, 114. The side sections 108 include complementary semi-circular seat portions 109 adapted to embrace the tube 47, when the parts are in assembled relationship as shown in FIG. 9. The clamping members 100 and 102 are secured around the tube 47 by bolts 116 and 118 extending through apertures 120 and 122 and complementary nuts 124 and 126. Preferably a set screw 128 is threaded through an aperture 130 in member 100 for clamping engagement with the tube or conduit 47. In order to provide the member 100 with sufficient strength and rigidity, an integral web section 132 is provided between the outer side 110 and the arcuate seat 109.

It is noted that the side end portions 108, 110, 112 and 114 along with the web portions 132 of the members 100 and 102 define large openings 134 and 136 through the members. These openings provide for substantially free flow of ambient air around the sensor 52 and facilitate the escape of steam from the vicinity of the sensor. This promotes rapid cooling of the sensor when the flow of steam stops for obtaining more precise regulation of the water temperature in the reservoir.

The clamping members 104 and 106 are also preferably identical to each other and molded from the same plastic material as the members 100 and 102. Thus, while the assembly incorporates four plastic parts, it has only two different parts which minimizes manufacturing costs. The members 104 and 106 have complementary grooves or seats 138 and 140 in mating faces or surfaces 142 for receiving and clampingly embracing opposite lead wires 144 and 146 of the thermister 52. Openings 148 are formed in the clamping members or blocks 104 and 106 for reducing material and enhancing the free flow of ambient air around and through the assembly.

Bolts 149 and 150 and complementary nuts 152 and 154 are provided for securing the blocks 104 and 106 together and to the underside of clamping member 102. The bolts 148 and 150 are adapted to extend through apertures 156 and 158 in bosses 160 and 162 of the member 102 and aligned apertures 164 and 166 in the blocks 104 and 106.

Figure 7:
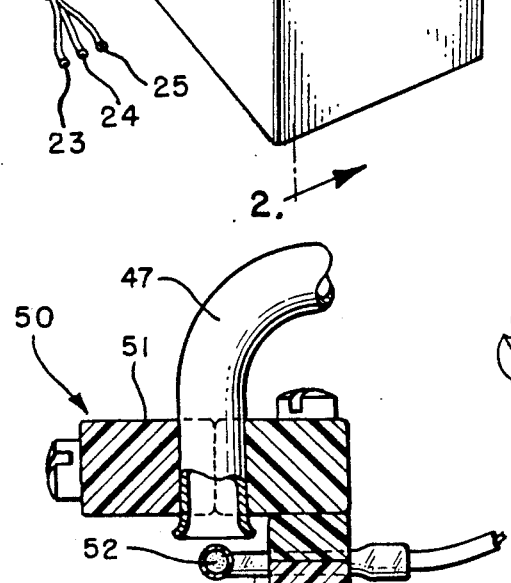
FIG. 7 is a cross-sectional view of the steam detector taken along line 7—7 of FIG. 6.
Figure 6:
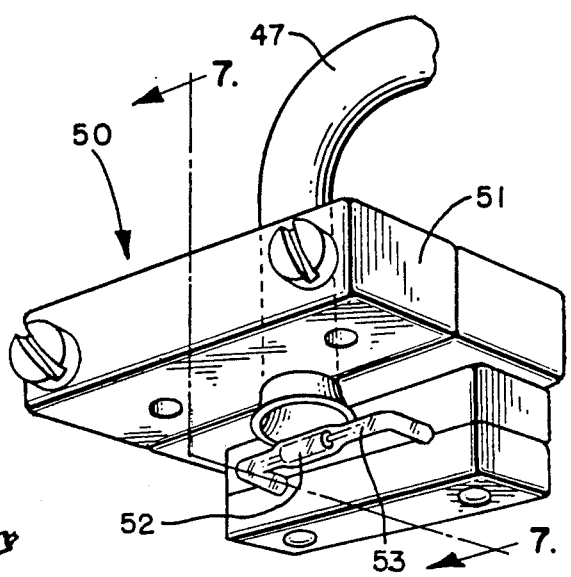
FIG. 6 is an enlarged cross-sectional view of the steam detector or sensor assembly incorporating the present invention taken along 6—6 of FIG. 5.

The lead wires 144 and 146 have sufficient strength and stiffness to serve to support the body of the thermister freely in the air at the desired location. As shown in FIGS. 6 and 7, the thermister is positioned directly in alignment with the discharge opening of the vent tube or conduit 47 so as to be immediately impacted by any steam flowing from the tube. At the same time the thermister body is thermally insulated from the reservoir and the tube 47 so that it will be effectively heated only by the steam and subsequently effectively cooled by ambient air for promoting rapid response and thus more precise cycling of the heater element and accurate maintenance of the water substantially at a boiling temperature without unnecessary boiling taking place.

As mentioned above, the thermister is encapsulated in a plastic sleeve 53. This sleeve also covers the wire leads 144 and 146 at least to points 168 and 170 where these uninsulated leads are connected to insulated wires 172 and 174 forming a part of the control circuitry. The plastic sleeve is made from a material having electrical insulating properties so that it serves as effective electrical insulation for the normally uninsulated thermister leads 144 and 146. At the same time the sleeve 53 is sufficiently thermally conductive to permit desired rapid heating and cooling of the thermister in response to the presence and absence of steam.

The sleeve 53 is formed from thin walled tubing which is heat shrunk over the thermister body 52 and the wire leads 144 and 146 to promote heat transfer between the parts. Preferably the wall thickness of the sleeve is about 0.020 inch to minimize any thermal insulation and any function of the sleeve as a heat sink. The plastic material of the sleeve also has the characteristics of withstanding repeated cycles of high and low temperatures without cracking and has good resistance to the absorption of water. While various plastic materials having these characteristics may be used, a preferred material is a heat shrinkable, irradiated, flexible polyolefin tubing currently sold under the name FIT-221.

When the clamping members or block and the thermister are assembled, the leads 144 and 146 and/or the wires 172 and 174 are crossed within a strain relief device or lock 176 which is secured to the member 102 by a screw 178 threaded into the aperture 130 in the member 102.

The heater control system described is unaffected by changes in boiling point as might be caused by water purity or altitude. The only requirement is that there be a few degrees difference between the ambient air around the sensor and the water boiling point.

While a particular embodiment of the invention has been shown and described, changes and modifications may be made therein without departing from the invention in its broader aspects. Therefore the aim in the appended claims is to cover all such changes and modifications as fall within the true spirit and scope of the invention.

I claim:

1. A sensor assembly for a boiling liquid apparatus having a liquid reservoir, a heater for said reservoir, control means responsive to a sensor for heating liquid in the reservoir, and a vent tube in communication with said reservoir, a vent opening formed in said tube for passing steam generated in the reservoir, said assembly comprising mounting means and a sensor having a temperature responsive body, said mounting means supporting said body for exposure to steam flowing from said vent opening, and said mounting means thermally insulating said body from said reservoir.

2. A sensor assembly, as defined in claim 1, wherein said mounting means comprises two pair of clamping members, a first pair of clamping members for embracing said vent tube, means for releasably clamping said pair of members on said tube, a second pair of clamping members secured to one of said first pair of clamping members and clampingly retaining said sensor in alignment with said vent opening.

3. A sensor assembly, as defined in claim 2, wherein said sensor comprises a thermistor providing said temperature responsive body and having electrical leads extending from opposite ends thereof, said leads being clamped between said second pair of clamping members.

4. A sensor assembly, as defined in claim 1, wherein said mounting means has aperture means therethrough for permitting flow of ambient air through the mounting means and around said temperature responsive body.

5. A sensor assembly for a boiling liquid apparatus having a liquid reservoir and vent tube providing a vent opening for steam generated by the boiling of liquid within said reservoir, said assembly comprising mounting means of thermal insulating material supported on said vent tube, a sensor having a temperature responsive body supported by said mounting means in alignment with said vent opening and connectable with means for controlling heating of the liquid within the reservoir, said air around said sensor for cooling the sensor in the absence of steam emitting from said vent opening.

6. A sensor assembly as defined in claim 5, wherein said sensor comprises a thermister providing said temperature responsive body and having electrical leads extending from opposite ends thereof, and a thin walled tube of electrical insulation surrounding said thermister body and said electrical leads, said tube being thermally conductive for promoting rapid heating of the thermister body by steam emitting from said vent opening and rapid cooling of the thermister body by ambient air in the absence of steam.

7. A sensor assembly, as defined in claim 6, which includes electrical wires connected with said leads at junctions, and strain relief means secured to said mounting means and engaging said wires for preventing strain on said junctions.

8. A sensor assembly for a boiling liquid apparatus having a liquid reservoir and a vent tube providing a vent opening for steam generated within the reservoir upon boiling of liquid therein, said assembly comprising a first pair of mounting members embracing said tube adjacent said vent opening, means releasably clamping said pair of members to said tube, a pair of clamping members releasably clamped together and secured to one of said first mentioned members, a sensor comprising a temperature responsive thermister body and electrical leads extending from opposite ends thereof and secured between said clamping members, said thermister body being supported substantially in alignment with said vent opening.

9. A sensor assembly, as defined in claim 8, wherein said first pair of members are identical to each other and said clamping members are identical to each other.

10. A sensor assembly, as defined in claim 9, wherein said first pair of members have openings therethrough for facilitating the flow of ambient air therethrough and around said sensor.

11. A sensor assembly as defined in claim 8 wherein said thermister body is encapsulated in an electrically insulating thermal conducting tube.

12. A sensor assembly as defined in claim 11 where comprises a polyolefin tube having a wall thickness of about 0.020 inch.

13. A sensor assembly for a boiling liquid apparatus having a liquid reservoir and vent tube providing a vent opening for steam generated by the boiling of liquid within said reservoir, said assembly comprising mounting means of thermal insulating material supported on said vent tube, a sensor having a temperature responsive body supported by said mounting means in alignment with said vent opening and connectable with means for controlling heating of the liquid within the reservoir, said air around said sensor for cooling the sensor in the absence of steam emitting from said vent opening, said sensor comprises a thermistor providing said temperature responsive body and having electrical leads extending from opposite ends thereof, and a thin walled tube of electrical insulation surrounding said thermistor body and said electrical leads, said tube being thermally conductive for promoting rapid heating of the thermistor body by steam emitting from said vent opening and rapid cooling of the thermistor body by ambient air in the absence of steam, electrical wires connected with said electrical leads at junctions, and strain relief means secured to said mounting means and engaging said wires for preventing strain on said junctions.

* * * * *

UNITED STATES PATENT AND TRADEMARK OFFICE
CERTIFICATE OF CORRECTION

PATENT NO. : 5,038,752

DATED : August 13, 1991

INVENTOR(S) : James H. Anson

It is certified that error appears in the above-identified patent and that said Letters Patent is hereby corrected as shown below:

Column 7, Line 11-12 "defined in claim 11 where comprises a polyolefin tube" it should read -- defined in claim 11 wherein said tube comprises a polyolefin tube --

Signed and Sealed this

Second Day of February, 1993

Attest:

STEPHEN G. KUNIN

Attesting Officer

Acting Commissioner of Patents and Trademarks